United States Patent [19]

Bortfeld et al.

[11] Patent Number: 4,543,723

[45] Date of Patent: Oct. 1, 1985

[54] SAFETY ARRANGEMENT FOR A HAND-HELD, POWER-DRIVEN PORTABLE TOOL

[75] Inventors: Manfred Bortfeld, Leutenbach; Eberhard Schieber, Backnang; Günter Dietzsch, Waiblingen, all of Fed. Rep. of Germany

[73] Assignee: Andreas Stihl, Waiblingen, Fed. Rep. of Germany

[21] Appl. No.: 490,565

[22] Filed: May 2, 1983

[30] Foreign Application Priority Data

May 3, 1982 [DE] Fed. Rep. of Germany ....... 3216446

[51] Int. Cl.[4] .............................................. B27B 17/02
[52] U.S. Cl. ......................................... 30/381; 30/382; 30/390; 83/200/61.57
[58] Field of Search ............... 200/61.57; 30/381, 382, 30/233, 276, 390; 83/DIG. 1

[56] References Cited

U.S. PATENT DOCUMENTS

| | | | |
|---|---|---|---|
| 2,575,926 | 11/1951 | Murray | 200/61.57 X |
| 2,945,099 | 7/1960 | Mayhew | 200/61.57 |
| 3,559,206 | 1/1971 | Beecham | 200/61.57 X |
| 3,711,946 | 1/1973 | Troutman | 30/276 |
| 4,006,528 | 2/1977 | Katsuya | 30/390 |
| 4,088,856 | 5/1978 | Tebben | 83/DIG. 1 |
| 4,378,637 | 4/1983 | Kieser | 30/233 |
| 4,432,139 | 2/1984 | Kohler | 30/382 |

Primary Examiner—Jimmy C. Peters
Attorney, Agent, or Firm—Walter Ottesen

[57] ABSTRACT

The invention is directed to a safety arrangement for a power-driven portable tool such as a motor-driven chain saw or the like. The portable tool has a housing equipped with two handles both of which are grasped by the operator to hold and guide the tool during use thereof. One of the handles is a bail handle mounted at the forward part of the housing. The safety arrangement includes two switches associated with respective ones of the handles. The switches are operatively connected to the motor so as to cause the same to be operative only when both switches are closed. At least a portion of one of the contacts of the bail handle switch is displaceable from a first position whereat the bail handle switch is open to a second position whereat the switch contacts come into mutual contact and the bail handle switch is closed. An elastic body associated with the bail handle acts on the one contact to effect the displacement to the second position in response to pressure applied to the elastic body by the operator of the tool when grasping the bail handle.

22 Claims, 12 Drawing Figures

SAFETY ARRANGEMENT FOR A HAND-HELD, POWER-DRIVEN PORTABLE TOOL

BACKGROUND OF THE INVENTION

The invention relates to a safety arrangement for a motor-driven, hand-held portable tool such as a chain saw or the like. The tool has a housing equipped with two handles which are grasped by the operator using both hands for holding and guiding the tool. The safety arrangement includes two switches arranged with respect to the handles, respectively. These switches must both be closed by actuating the switch contacts in order to operate the tool. One of the handles is mounted on the forward portion of the housing and is configured as a bail handle.

With a safety arrangement of this type, the operator of the tool is compelled to always grasp both handles in order to prevent accidents. For this reason, the working tool of the portable tool, for example a cutting chain, is brought immediately to rest as soon as one of the two switches is open irrespective of what occurs should the portable tool be held by only one of its handles.

U.S. Pat. No. 3,131,277 discloses a safety arrangement for a chain saw equipped with a bail-type handle. The safety arrangement includes two switches mounted on the bail-type handle, one of which is located at the upper leg of the handle and the other is located on the downwardly extending portion of the handle. In this way, each switch corresponds to a particular working position of the motor-driven chain saw. If both switches are released, a short circuit is caused so that the motor of the chain saw is disconnected. Therefore, each time that the forward handle is released, the motor must again be started. Furthermore, the operator is compelled to grasp the handle at specific locations because of the arrangement of the switches thereon. These positions, however, often do not correspond to the most desirable location for holding the portable tool during operation, so that the use of the chain saw is made more difficult.

In addition, the switch is coupled to a blocking member slidably mounted on the bail-type handle. This blocking member must be additionally actuated after actuating the switch so that the operation of the portable tool is difficult.

SUMMARY OF THE INVENTION

It is an object of the invention to provide a safety arrangement which retains for the operator the greatest amount of safety and yet enables the operator to operate the switch independently of the working position of the portable tool.

The safety arrangement of the invention is for a power-driven portable tool such as a motor-driven chain saw or the like. The portable tool has a housing equipped with two handles both of which are grasped by the operator to hold and guide the tool during use thereof. One of the handles is a bail handle mounted at the forward part of the housing.

The safety arrangement includes two switches associated with respective ones of the handles. The switches are connected to the motor so as to cause the same to be operative only when both switches are closed.

The switch associated with the bail handle includes first and second contacts; at least one of the contacts is mounted with respect to the bail handle so as to be resiliently deformable from a first position whereat the bail handle switch is open to a second position whereat said contacts come into mutual contact and said bail handle switch is closed. Elastic means are provided for acting on the one contact to effect the deformation to the second position in response to pressure applied by the operator of the tool when grasping the bail handle.

In the safety arrangement according to the invention, the switch of the forward bail handle is actuated in every position of the power tool only by the holding force developed while holding and guiding the tool. It is therefore not necessary that the operator hold the forward bail handle at a predetermined location. The power tool can therefore be guided in a simple manner whereby the operator can change the position of his grip on the bail handle. Should the operator release his grip on the forward handle or should his hand slip from this handle, then the holding force operating on the forward handle is released and the switch is opened. In this connection, it is especially preferable if the motor is not turned off and is instead only disconnected from the drive of the working tool which it drives so that the operator can immediately continue to work with the apparatus as soon as he has grasped the forward handle again. This mode of operation is possible pursuant to a preferred embodiment of the invention.

BRIEF DESCRIPTION OF THE DRAWING

The invention will now be explained with reference to the drawing wherein.

DESCRIPTION OF THE PREFERRED EMBODIMENTS OF THE INVENTION

Figure 1:
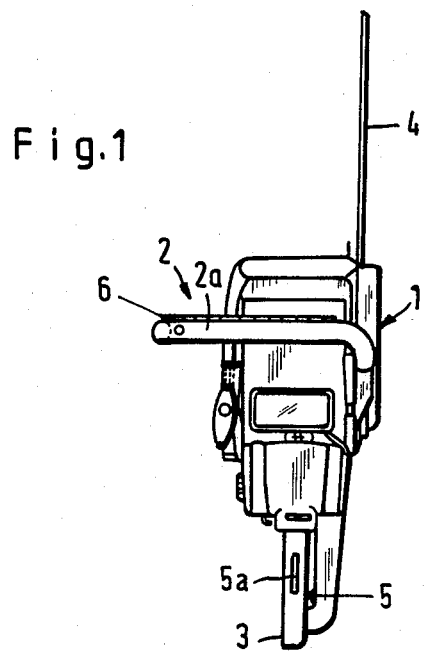
FIG. 1 is a plan view of a motor-driven chain saw equipped with a safety arrangement according to the invention.

FIG. 1 is a schematic representation of a chain saw in plan view. This hand-held portable tool includes a housing 1 having a forward handle 2 and a rear handle 3. The cutting chain is guided on the guide bar 4 and is not shown. The rear handle 3 is held with the right hand when working with the tool and includes a switch 5 for switching on the drive motor as well as a blocking lever 5a which is provided if the chain saw is driven by an internal combustion engine. In this instance, the switch 5 is a gas lever and the blocking lever 5a must be actuated simultaneously with the gas lever to bring the internal combustion motor into operation. This arrangement is conventional and does not require further explanation here.

The forward handle is a bail-type handle and has a segment 2a disposed above the housing 1 transverse to the guide bar 4. The bail handle 2 is connected at its ends to the housing 1 by vibration damping elements such as rubber mounts or vibration mounts. Such a vibration damping element will be discussed later in connection with FIG. 4.

The bail handle 2 is provided with a switch 6 which extends over substantially the entire length of the upper segment 2a and over substantially the entire length of the downwardly extending segment of this handle. The latter downwardly extending segment of the bail handle 2 is indicated by the broken line 2b. The operator grasps the bail handle 2 with the left hand and thereby also grasps the switch 6 irrespectively of whether he grasps the bail handle at the upper segment 2a or at the downwardly extending side segment 2b.

Figure 2:
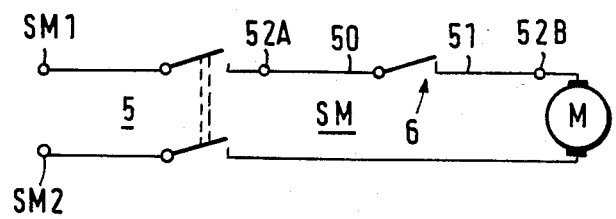
FIG. 2 is a schematic showing the arrangement of a safety switch in the supply current circuit of a hand-held tool driven by an electric motor.

The chain saw can also be driven by an electric motor. FIG. 2 is an electric schematic showing the arrangement of both switches 5 and 6 for a hand-held portable tool driven by an electric motor. The current supply circuit SM for the electric motor M is connected at two input terminals SM1 and SM2 which are connected to line current via a cable. The two pole switch 5 lies in the current circuit SM and, in its open position, interrupts the input conductor extending from terminal SM1 to the motor M as well as the return conductor connecting the motor to terminal SM2. A conductor 50 is connected to the contact of switch 5 lying in the input supply conductor. This conductor 50 is guided from the housing at location 52A to the switch 6. A conductor 51 is connected to the cooperating contact of switch 6 and is guided back to the housing and to the motor at location 52B. Both conductors 50 and 51 are segments of the current supply conductor. The motor only receives current when both switches 5 and 6 are closed.

Figure 3:
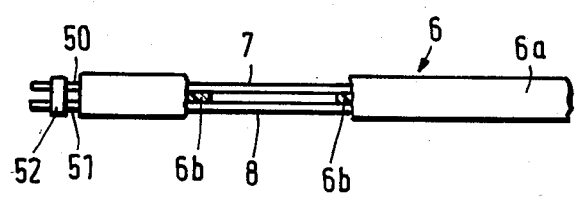
FIG. 3 is an embodiment of a switch for use as a safety switch with a portion of the insulation sleeve broken away.

The embodiment of the switch 6 shown in FIG. 3 will now be discussed with reference to the schematic according to FIG. 2. The switch 6 includes two band-like, resilient contact strips 7 and 8 which are held approximately parallel to one another by means of spacers 6b. The spacers 6b are arranged over the length of the contact strips 7 and 8 at equal intervals and are made of rubber elastic insulating material such as foam Polyurethane. The contact strips 7 and 8 and the spacers 6b are surrounded by an insulating jacket 6a which is likewise made of an elastic material such as rubber or an elastic deformable plastic which permits the contact strips 7, 8 to be pressed together until a touch contact is obtained. The insulating jacket 6a can be integrated into the usual jacketing of the handle 2, for example, by molding. The insulating jacket 6a can also be glued onto the handle 2. Preferably, the entire switch 6 is releasably mounted to the handle, for example with the aid of clamps or clips.

Two conductors 50 and 51 are connected to contact strips 7 and 8, respectively, within the insulating jacket 6a. These conductors 50 and 51 are guided into the housing by means of a grommet 52 at circuit locations 52A and 52B. If the handle 2 is not grasped by a hand of the operator, then the contact strips 7 and 8 are in the rest position shown in FIG. 3 wherein they do not touch each other. The switch 6 interrupts the current supply circuit SM when in the rest position shown in FIG. 3. Should the handle 2 be grasped by the operator at any location in the region of segment 2a or the downwardly extending side segment leg 2b of the handle, then the contact strips 7 and 8 will become elastically deformed between the insulating spacers 6b so that they touch each other and the switch 6 closes the current supply circuit SM. As soon as the forward handle 2 and therewith the switch 6 is released, the contact strips 7 and 8 resiliently separate and return to their rest position and open the current supply circuit SM.

The chain saw is held by the operator at segment 2a when cutting branches. However, should the cutting chain 4 be guided in a horizontal position, for example in order to cut down a tree, then the chain saw is held by the operator on the downwardly extending leg 2b which extends in a direction perpendicular to the upper segment 2a. In both working positions, the switch 6 is per force actuated when the operator grasps the handle 2.

Figure 4:
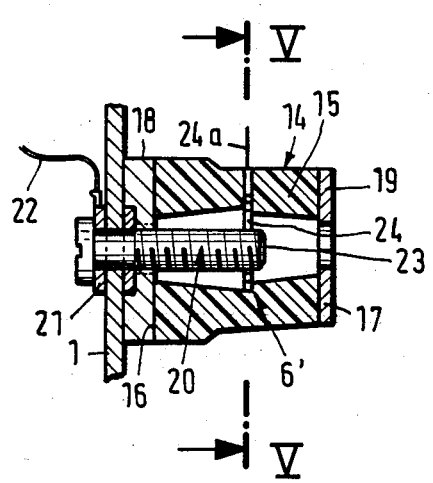
FIG. 4 is a safety switch according to another embodiment wherein the switch is incorporated in a vibration damping member.
Figure 5:
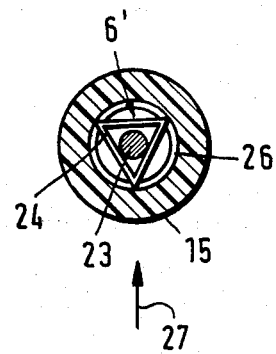
FIG. 5 is a section view of the safety switch of FIG. 4 taken along line V—V of FIG. 4.

In the embodiment shown in FIGS. 4 and 5, the switch 6' is arranged in a vibration damping element 14 configured as a vibration mount. This element 14 has resilient means in the form of an approximately cylindrical, rubber elastic body 15 having metal plates 18 and 19 vulcanized to respective end faces 16 and 17. The element 14 is secured to the housing 1 and to the handle 2 at these metal plates 18 and 19, respectively. One of the mounting screws of the element 14 defines a contact of the switch. An electric conductor 22 is connected to one of the supporting disks 21 of this bolt 20. The conductor 22 is connected with a contact of switch 5 in a manner similar to the way in which conductor 50 (FIG. 2) was connected thereto. The supporting disk 21 and the metal plate 18 can be insulated with respect to the housing 1 so that between the conductor 22 and the housing 1 no electric connection exists. In the illustrated embodiment, the conductor 22 is connected to ground via the supporting disk 21 and the bolt 20; namely, the conductor 22 is electrically connected to the housing 1 so that, as is conventional, a connection is made to the ground conductor of the current source via a contact of the switch 5. In this instance, the housing 1 serves as the return conductor (see FIG. 2) and the switch 6 connects the ground return terminal of the motor M to ground.

The bolt 20 projects with its free end 23 into the hollow space of the elastic body 15 and is at this location surrounded by a contact strip formed as a triangle. This contact strip 24 constitutes the cooperating contact for coacting with the bolt 20 and surrounds the free end 23 of the bolt 20 with a predetermined spacing so long as the handle 2 is not loaded with the weight of the chain saw. A conductor 24a is connected to the contact strip 24 which leads to the motor.

As shown in FIGS. 4 and 5, the contact strip 24 is set with its corners into a ring-shaped groove 26 which is formed in the inner wall of the elastic body 15 so that it is fixed against displacement in the axial direction of the element 14 and also against rotation about the longitudinal axis of the element.

If the forward handle 2 of the chain saw is grasped, then the rubber elastic body 15 is deformed under the weight of the chain saw in a direction transverse to its longitudinal axis whereby both plates 18 and 19 are displaced with respect to each other and remain substantially parallel to each other as they are so shifted. In this way, the free end 23 of bolt 20 comes into contact with the contact strip 24 so that the switch 6' is closed. This switch position is shown in FIG. 5, wherein it is assumed that the force acting on the handle 2 and thereby on the plate 17 is in the direction shown by the arrow 27 in the drawing.

Figures 6, 6A:
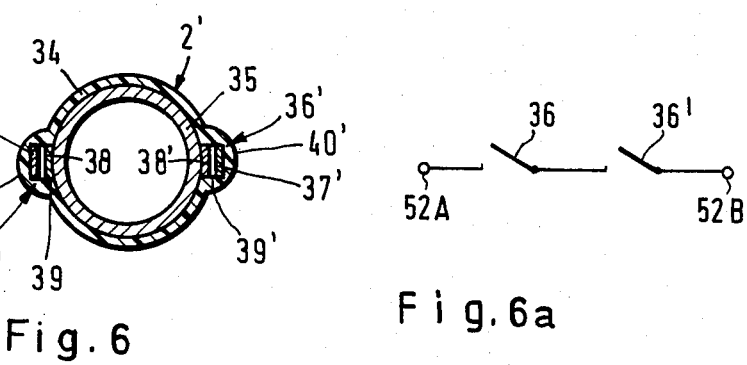
FIG. 6 is a section view showing two safety switches in the enclosing jacket of the forward handle of a motor-driven portable tool.
FIG. 6a is a schematic representation of two safety switches of FIG. 6.

In the embodiment according to FIG. 6, the handle 2' is made of a metal tube 35 having a jacket 34 and within the jacket 34 of the tube 35 are arranged two switches 36 and 36'. The jacket 34 is made of elastic insulating material, for example rubber, and has two protrusions 40 and 40' lying diametrically opposite one another. These protrusions 40 and 40' extend over the mid and side portions of the handle 2' so that they extend over the entire region at which the operator can grasp the handle with his hand. Both switches 36 and 36' are imbedded in these protrusions and are configured as shown in FIG. 3. Accordingly, the switch 36 comprises two spring elastic contact strips 37 and 38 and switch 36' likewise comprises spring elastic contact strips 37' and 38'. Both sets of contact strips are arranged in spaced relationship to each other. Channels 39 and 39' are provided in protrusions 40 and 40', respectively, in order to imbed the two switches. The material of the jacket 34 is so soft that the contacts can be closed by means of pressure applied to the protrusions. Both switches 36 and 36' are electrically connected in series as shown in FIG. 6a. Their arrangement on diametrically opposite sides of the handle guarantees that the current circuit can only then be closed when the hand of the operator tightly grasps the handle.

Figure 8:
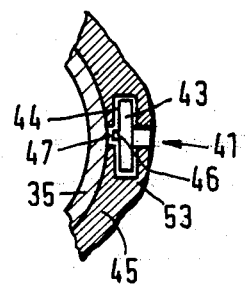
FIG. 8 is an enlargement of the portion A of FIG. 7.
Figure 7:
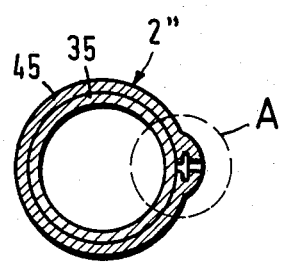
FIG. 7 is a further embodiment of the safety switch arranged in an enclosing jacket of the forward handle.

In the embodiment of FIGS. 7 and 8, the handle 2" likewise includes a metal tube 35 which is surrounded by a jacket 45. This jacket is provided with a protrusion 53 which likewise extends over the entire region at which the handle can be grasped by the hand of the operator. A contact strip 43 of switch 41 is laid into the channel 44 of the protrusion 53. The cooperating switch contact is constituted by the handle tube 35 itself. The channel 44 is therefore open in the direction toward the handle tube 35 so that a rib 46 of the contact strip 43 can penetrate the corresponding opening 47 and contact the handle tube 35 as soon as adequate pressure is applied to the protrusion 53. This embodiment has the advantage that the contact strip 43 can simply be pushed into the channel 44.

In lieu of a through extending rib, the contact strip 43 can have individual protuberances arranged in its longitudinal direction one behind the other.

Figure 9:
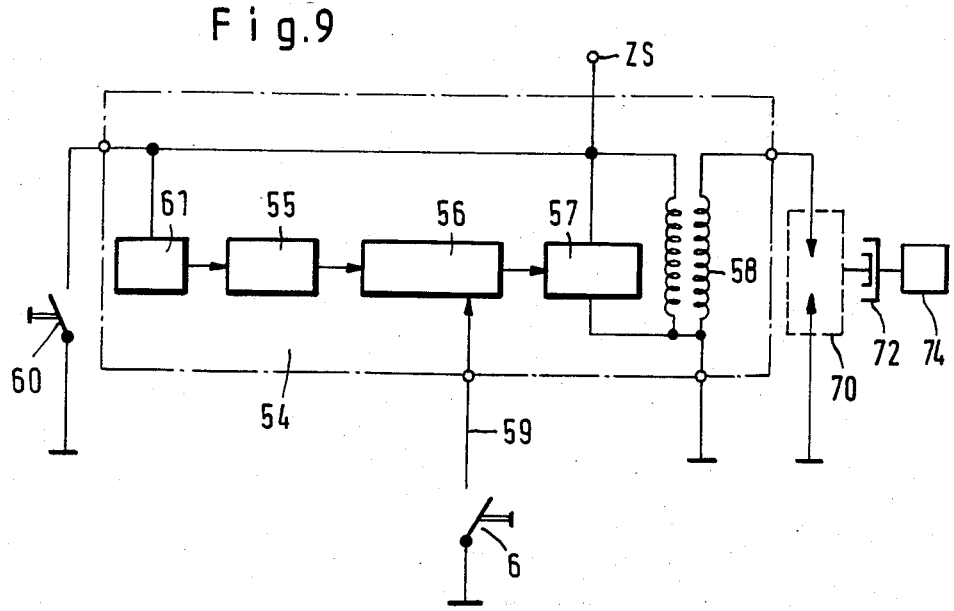
FIG. 9 is a block diagram showing the control of an internal combustion engine of a hand-held portable tool incorporating the safety switch.

FIG. 9 shows a block diagram of the control arrangement of an ignition current circuit for an internal combustion engine which incorporates the two switches 5 and 6. The switch 5 (not shown) is a gas lever. The electronic control device 54 operates as a rpm limiter for the situation wherein the switch 6 is open; that is, for the situation where the handle 2 is not grasped by the hand of an operator. The speed of rotation (rpm) of the motor 70 is then limited so that it is insufficient to couple the drive of the chain saw to the motor shaft. Conventionally, a centrifugal clutch 72 is arranged between the shaft of the motor 70 and the drive 74 of the cutting chain. This clutch 72 establishes a tight connection to the drive only at predetermined motor rotational speed.

An ignition coil 58 is included in the control arrangement 54 and during normal operation functions in the conventional manner. The ignition coil 58 is connected via connecting terminal ZS and is supplied with an ignition voltage having a pulse-shaped waveform. The ignition coil 58 is connected in parallel with a control circuit 57. The control circuit 57 functions in such a manner that it shunts the ignition coil 58 for the time that it is activated. It is possible to configure the control circuit 57 so that it periodically suppresses a plurality of sequential impulses. When the control circuit 57 is in operation, the ignition coil 58 receives only so many impulses per unit of time so that it corresponds to a predetermined rotational speed, for example, a rotational speed of 3,000 rpm. The control arrangement 54 contains a tachometer 61 which measures the rotational speed (rpm) of the motor and delivers a signal having a magnitude proportional to the rotational speed to a comparator 55 connected in cascade therewith.

A fixed reference value is fed into the comparator which corresponds to the predetermined rotational speed of, for example, 3,000 rpm. If the measured actual value of rpm is equal to or greater than the reference value, then the comparator delivers a signal to an electronic switch 56 which is activated by this threshold value and the control circuit 57 is activated.

If the control circuit 57 is simply configured as a shunt to the ignition coil 58, then the components 61, 55, 56 and 57 constitute a control circuit. The ignition voltage is short circuited as soon as the rotational speed of the motor exceeds the reference value and the short circuit is removed when the motor rotational speed drops below a value lying under the reference value so that the ignition can again take place and the rotational speed increases again. This control circuit therefore operates as a two-step controller.

On the other hand, if the control circuit 57 is utilized to suppress impulses periodically, the motor rotational speed can be held at a predetermined value so long as the control circuit 57 is activated. The electronic switch 56 has a second input which is connected to ground via a control conductor 59 by means of which the switch 56 can be blocked so that the control circuit 57 can no longer be placed into operation. The switch 6 lies in the control conductor 59. As described above, the switch 6 is closed as soon as the chain saw is held at the handle 2. By closing the switch 6, the control circuit 61, 55, 56 and 57 is interrupted and the control circuit 57 is deactivated so that the rotational speed of the motor can increase to its operational value and the drive of the chain saw can be connected to the motor via the centrifugal clutch. In lieu of the switch 6, the switch 6' (FIGS. 4 and 5) or the switch 41 (FIG. 8) can be used as well as the switch combination 36, 36' (FIG. 6).

In the event that the operator releases the handle 2 during work with the chain saw or, for example, because of a kickback situation his hand slips from the handle 2, the switch 6 is opened and the control is immediately set into action so that the motor rotational speed sinks to the threshold value, for example 3000 rpm, and the centrifugal clutch 72 disconnects the drive 74 to the cutting chain. In this way, the motor does not come to standstill; rather, it maintains a predetermined no-load rotational speed corresponding to the threshold value so that further work with the chain saw can only be conducted by grasping the handle 2. With the shorting switch 60, the ignition voltage can, in dangerous situations, be completely short circuited and the motor turned off.

Figure 10:
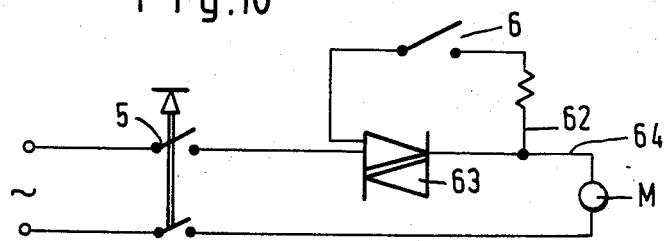
FIG. 10 is a block diagram of a control arrangement for an electric motor of a portable tool wherein the control arrangement incorporates a safety switch.
Figure 11:
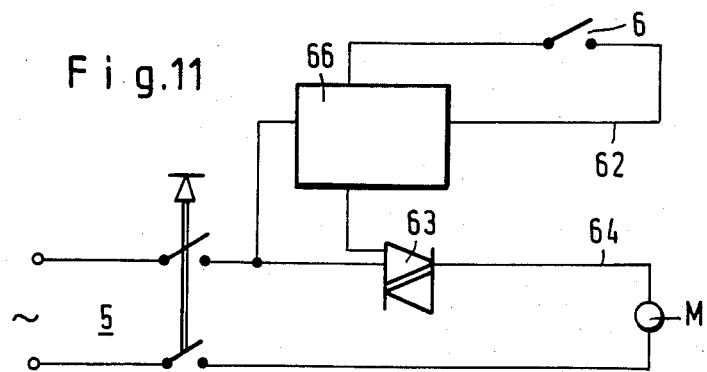
FIG. 11 is a block diagram of a further embodiment of the control arrangement of the electric motor of a portable tool incorporating a safety switch.

FIGS. 10 and 11 show a circuit arrangement corresponding to the concept schematic according to FIG. 2 for operating a portable tool driven by an electric motor.

The switch 6 (or any one of the switch means 6', 41 or the combination 36, 36') constitutes part of a current circuit 62 by means of which an electronic switch 63 is controlled. In the illustrated embodiment, the electronic switch is a Triac, which is made up of two silicon rectifiers (SCR) connected anti-parallel. The Triac lies in the current supply circuit 64 of the motor M. This current circuit 64 is connected to the line AC voltage via a two-pole switch 5. As long as the switch 6 is open, the switch 63 is blocked in both directions so that the electric motor M cannot start to run. If the switch 6 is closed, then both diodes of the Triac become conductive thereby enabling the current supply circuit for the motor M to be closed as soon as the switch 5 is actuated.

If the motor is fed with direct current, for example from a battery, an electronic switch 63 such as a thyristor or a transistor can be used which is blocked when the switch 6 is open and which can be made conductive via the control circuit 62 as soon as the switch 6 is closed.

In the embodiment of FIG. 11, the electronic switch 63 likewise lies in the current supply circuit of the motor; however, here the switch 63 is activated via a logic circuit 66 which, in turn, is activated by closing the switch 6. The logic circuit 66 can include a circuit for controlling rotational speed by means of which the electronic switch 63 can continuously be switched from its closed position to its open position so that the motor receives a continuously increasing operational current up to the maximum value when the switch 6 is closed and thereby reaches its rated rotational speed gradually therefore providing a delayed or smooth start. Furthermore, or in lieu thereof, the logic circuit can operate as an overload safety device and/or it can, as one operation, monitor temperature for the motor. In every instance, the logic circuit is made operational via control current circuit 62 by closing switch 6 in order to make the switch 63 conductive. If the logic circuit 66 also has a monitoring function, it can also block the electronic switch 63 when the switch 6 is closed.

It is understood that the foregoing description is that of the preferred embodiment of the invention and that various changes and modifications may be made thereto without departing from the spirit and scope of the invention, as defined in the appended claims.

What is claimed is:

1. A safety arrangement for a portable tool driven by a gasoline motor such as a motor-driven chain saw or the like, the portable tool including a housing equipped with two handles both of which are grasped by the operator to hold and guide the tool during use thereof, one of the handles being a bail handle mounted at the forward part of the housing; and, a movable cutting tool for performing the work of the portable tool; the safety arrangement comprising:

speed-dependent mechanical coupling means for coupling said working tool to said motor when the rotational speed of the latter increases beyond a predetermined value thereof and for decoupling said working tool from said motor when the rotational speed of the latter falls below said predetermined value thereby disabling said working tool so as not to constitute a danger to the operator;

an electronic control device operatively connected to said motor for maintaining the speed thereof below said predetermined speed when said device is activated;

two switches associated with respective ones of said handles and operatively connected to the motor so as to cause the same to be operative only when both switches are closed; and, the one switch associated with said bail handle including: first and second contacts; at least one of said contacts being made of a resilient material and being mounted with respect to said bail handle so as to be resiliently deformable from a first position whereat said bail handle switch is open to a second position whereat said contacts come into mutual contact and said bail handle switch is closed; and elastic means for acting on said one contact to effect said deformation to said second position in response to pressure applied to said elastic means by the operator of the tool when grasping the bail handle;

said electronic control device including control circuit means incorporating said one switch for maintaining said device in the deactivated condition so long as said one contact remains in said second position.

2. The safety arrangement of claim 1, said elastic means being a body of plastic arranged on said bail handle; said one contact being configured as a contact strip and disposed within said body of plastic.

3. The safety arrangement of claim 2, said one contact strip being arranged on said bail handle to extend along the entire length thereof whereat the operator of the portable tool can grasp the same.

4. The safety arrangement of claim 1, said elastic means being a body of plastic arranged on said bail handle; said first and second contacts being configured as respective contact strips and being disposed in said body of plastic; and spacer means disposed between said strips for maintaining the same parallel to each other so long as no load is applied to the bail handle.

5. The safety arrangement of claim 2, said bail handle being a tubular metal member, said body of plastic being a jacket surrounding said tubular metal member, said one contact strip being disposed in said body of plastic in close proximity to said metal member, said tubular metal member defining said second contact.

6. The safety arrangement of claim 5, said body of plastic having a protrusion extending parallel to said tubular member, said body having a channel formed therein at said protrusion with an elongated opening communicating with said tubular member, said one contact strip being disposed in said channel and having a rib formed thereon at said elongated opening to penetrate the latter in response to said pressure and contact said tubular member whereby said one contact strip is in said second position.

7. The safety arrangement of claim 2, said bail handle being a tubular metal member, said body of plastic being a jacket surrounding said tubular metal member; said switch associated with the bail handle being switch means including a first switch and a second switch connected in series and arranged within said body of plastic, the two contacts of each of said first and second switches being configured as respective contact strips, and spacer means between said strips of each of said first and second switches for maintaining said strips parallel to each other so long as no load is applied to the bail handle.

8. The safety arrangement of claim 7, said jacket having two protrusions formed thereon extending parallel to said tubular member, said protrusions having respective channels formed therein for receiving corresponding ones of said switches of said switch means thereby imbedding the same in said jacket.

9. The safety arrangement of claim 8, said protrusions being disposed in said jacket so as to be diametrically opposite each other.

10. The safety arrangement of claim 1, said speed-dependent mechanical coupling means being a centrifugal clutch.

11. The safety arrangement of claim 1, said electronic control device comprising:
a control circuit for controlling the ignition of said motor;
tachometer means for measuring the actual rotational speed of the motor and providing an electrical output signal having a magnitude proportional to said speed;
comparator means connected to said tachometer means for receiving said tachometer output signal and comparing the same to a reference value corresponding to said predetermined rotational speed and then providing a comparator output signal if said actual rotational speed is greater than said predetermined rotational speed; and,
an electronic switch forming part of said control means and being connected to said comparator means for receiving said comparator output signal and being connected to said control circuit for activating the same to control the ignition of said motor in response to said comparator output signal to maintain the speed thereof below said predetermined rotational speed so long as said one contact remains in said second position.

12. The safety arrangement of claim 11, said control circuit including means for suppressing impulses to the ignition coil of said motor to maintain the speed of said motor below said predetermined rotational speed during the time that said electronic control device remains active.

13. A safety arrangement for a power-driven portable tool such as a motor-driven chain saw or the like, the portable tool having a housing equipped with two handles both of which are grasped by the operator to hold and guide the tool during use thereof, one of the handles being a bail handle mounted at the forward part of the housing, the safety arrangement comprising:
two switches associated with respective ones of said handles and operatively connected to the motor so as to cause the same to be operative only when both switches are closed; and
the switch associated with said bail handle including: two contacts; at least one of said contacts being mounted with respect to said bail handle so as to be displaceable from a first position whereat said bail handle switch is open to a second position whereat said contacts come into mutual contact and said bail handle switch is closed; and elastic means for acting on said one contact to effect said displacement to said second position in response to pressure applied to said elastic means by the operator of the tool when grasping the bail handle.

14. The safety arrangement of claim 13 comprising: said elastic means being a vibration attenuation member including resilient means for connecting one end of said bail handle to said housing whereby said resilient means is deformed in a given direction by the weight of the portable tool when the latter is held at the bail handle by the operator, the other contact of said bail handle switch being fixedly mounted with respect to said housing so as to be disposed transversely to said direction, and said one contact of said bail handle switch being mounted in said resilient means so as to be displaced in said direction into said second position while said resilient means remains deformed.

15. The safety arrangement of claim 14, said one contact being configured as a contact band disposed in surrounding relationship to said other contact so as to provide a predetermined clearance therebetween when said bail handle switch is in said first position corresponding to the condition wherein no load is applied to the bail handle.

16. The safety arrangement of claim 13, said elastic means being an attenuation mount including: an approximately cylindrical rubber elastic hollow body deformable in a given direction by the weight of the portable tool when the latter is held at the bail handle by the operator; and two metal plates fixedly mounted to respective longitudinal ends of said hollow body; said attenuation mount being interposed between one end of said bail handle and said housing with one of said plates being fixedly secured to the bail handle and the other one of said plates being fixedly secured to said housing; at least one of said plates being fixedly secured with a bolt that extends into the interior of said hollow body and transversely to said direction to define the other contact of said bail handle switch; said one contact being mounted in said hollow body so as to be displaceable in said direction into said second position to make contact with said other contact when the portable tool is held by the operator at the bail handle.

17. A motor-driven portable tool such as a chain saw or the like comprising:
a housing having two handles attached thereto which are grasped by the operator to hold and guide the tool during use thereof;
a gasoline motor mounted in the housing;
a working tool for performing the work of the portable tool;
speed-dependent mechanical coupling means for coupling said working tool to said motor when the rotational speed of the latter increases beyond a predetermined value thereof and for decoupling said working tool from said motor when the rotational speed of the latter falls below said predetermined value thereby disabling said working tool so as not to constitute a danger to the operator;
an electronic control device operatively connected to said motor for maintaining the speed thereof below said predetermined speed when said device is activated;
a safety switch associated with one of said handles said safety switch being actuable from an open position to a closed position in response to pressure applied thereto by the operator of the tool when grasping said one handle; and,
said electronic control device including control circuit means incorporating said safety switch for maintaining said device in the deactivated condition so long as said safety switch remains in said closed position.

18. The motor-driven portable tool of claim 17, said speed-dependent mechanical coupling means being a centrifugal clutch.

19. The motor-driven portable tool of claim 17, said electronic control device comprising:
- a control circuit for controlling the ignition of said motor;
- tachometer means for measuring the actual rotational speed of the motor and providing an electrical output signal having a magnitude proportional to said speed;
- comparator means connected to said tachometer means for receiving said tachometer output signal and comparing the same to a reference value corresponding to said predetermined value of rotational speed and then providing a comparator output signal if said actual rotational speed is greater than said predetermined rotational speed; and,
- an electronic switch forming part of said control means and being connected to said comparator means for receiving said comparator output signal and being connected to said control circuit for activating the same to control the ignition of said motor in response to said comparator output signal to maintain the speed thereof below said predetermined rotational speed so long as said one safety switch remains in said closed position.

20. The motor-driven portable tool of claim 19, said control circuit including means for suppressing impulses to the ignition coil of said motor to maintain the speed of said motor below said predetermined rotational speed during the time that said electronic control device remains active.

21. The motor-driven portable tool of claim 17, said one handle being a forward handle mounted at the forward part of said housing, said safety switch including first and second contacts, at least a portion of one of said contacts being displaceable from a first position whereat said switch is in said open position to a second position whereat said contacts come into mutual contact and said switch is in said closed position; and, elastic means for acting on said one contact to effect said displacement to said second position in response to the pressure applied to said elastic means by the operator of the tool when grasping the forward handle.

22. A motor-driven portable tool such as a chain saw or the like comprising:
- a housing having two handles attached thereto which are grasped by the operator to hold and guide the tool during use thereof, one of the handles being a forward handle mounted at the forward part of the housing;
- an electric motor mounted in the housing;
- an electric supply circuit for supplying current to said motor;
- a working tool operatively connected to the motor;
- a safety arrangement including two switches associated with respective ones of said handles and forming part of said circuit;
- the one switch associated with said forward handle including first and second contacts, at least a portion of one of said contacts being displaceable from a first position whereat said one switch is open to a second position whereat said contacts come into mutual contact and said one switch is closed; and, elastic means for acting on said one contact to effect said displacement to said second position in response to pressure applied to said elastic means by the operator of the tool when grasping the forward handle; and,
- electronic switch means for controlling the flow of supply current to said motor; said electronic switch means including: an electronic switch serially connected into said supply circuit and having a control circuit; and said forward handle switch being connected into said control circuit for switching said electronic switch into its conductive mode when said one contact is in said second position; and,
- a logic circuit connected into said control circuit for activating said electronic switch means when said one contact is in said second position.

* * * * *